United States Patent [19]

Sorensen et al.

[11] Patent Number: 4,874,534

[45] Date of Patent: Oct. 17, 1989

[54] METHOD FOR REMOVAL OF ORGANIC SOLVENTS FROM AQUEOUS PROCESS STREAMS

[75] Inventors: James L. Sorensen; Mark D. Yarbro, both of San Manuel; Charles A. Glockner, Tucson, all of Ariz.

[73] Assignee: Magma Copper Company, San Manuel, Ariz.

[21] Appl. No.: 141,736

[22] Filed: Jan. 11, 1988

[51] Int. Cl.$^4$ .............................................. B01D 21/00
[52] U.S. Cl. .................................... 210/803; 204/165; 204/167; 210/804; 210/805
[58] Field of Search ............... 209/170, 168, 166, 165, 209/164, 167; 210/221.1, 221.2, 460, 117, 800, 803, 804, 805, 806; 423/26; 75/1 R, 101 R, 109, 117, 72, 108

[56] References Cited

U.S. PATENT DOCUMENTS 4,130,626 12/1978 Hoover ................................ 209/165
4,203,837 5/1980 Hoge et al. ......................... 209/166
4,617,113 10/1986 Christophersen et al. ......... 209/170

Primary Examiner—Frank Sever
Attorney, Agent, or Firm—Pennie & Edmonds

[57] ABSTRACT

An improved method of separating organic solvents from aqueous process streams is disclosed in connection with a copper solvent extraction/electrowinning process. An aqueous solution having droplets of an organic solvent entrained therein is admitted to the upper part of a vertically extending vessel, and air bubbles are passed therethrough from an air inlet near the bottom of the vessel. The aqueous solution is continually removed from a point at the bottom of the vessel beneath the point at which the bubbles are admitted, such that countercurrent flow of the bubbles and solvent occurs. The bubbles bind the droplets of organic solvent and can be controlled to form a froth on the upper surface of the solution within the vessel. The froth can readily be collected and the organic solvent condensed therefrom.

16 Claims, 4 Drawing Sheets

METHOD FOR REMOVAL OF ORGANIC SOLVENTS FROM AQUEOUS PROCESS STREAMS

FIELD OF THE INVENTION

This invention relates to a method for removal of entrained organic solvents from aqueous process streams. More particularly, the invention relates to methods and apparatus for removal of organic solvents used in various industrial operations, such as solvent extraction of metallic copper, from aqueous process streams, e.g., electrolyte solutions of acid and copper sulfate in water used in the electrowinning recovery extraction process.

BACKGROUND OF THE INVENTION

As indicated above, the present invention relates to methods and apparatus for removal of organic solvents from various aqueous process streams, which are employed in many industrial applications. The invention will be described in detail in connection with a copper solvent extraction/electrowinning process which is currently in use, but it will be recognized by those of skill in the art that the invention has applicability beyond this particular environment.

Modern techniques for recovery of copper from ore involve the use of organic solvents to transfer the copper from a first weakly acidic aqueous process stream to a second strongly acidic aqueous solution via ion exchange. In a first step, a first copper-rich, weakly acidic aqueous solution, referred to as a "pregnant leach" solution, is mixed with the organic solvent. The copper ions are preferentially bound to the solvent. The solvent is immiscible in the aqueous solution and can be separated therefrom by settling. The organic solvent, having had the copper ions bound thereto, is then mixed with a strongly acidic "electrolyte" solution. In this step, the copper is removed from the solvent by the electrolyte, while the molecules of the organic solvent pick up a hydrogen ion from the sulfuric acid. The solvent is then physically separated from the electrolyte by settling and is reused. The copper is subsequently removed from the electrolyte by electrowinning, that is, by electroplating the copper out of the electrolyte solution onto a cathode in a plating bath.

The electrolyte, which is an aqueous solution containing a relatively high proportion of sulfuric acid, the leaching solution, which is an aqueous solution containing a relatively low amount of sulfuric acid, and the organic solvent are thus all reused in the process; the process does not "consume" any of these materials. Electricity is the primary source of energy which is applied.

However, the degree to which these materials can be reused depends on the degree to which they are separated from one another at several stages in the process. More particularly, after the leaching solution has been exposed to the ore, becoming a copper-rich "pregnant leach" solution, it is then mixed with the organic solvent, which preferentially exchanges its hydrogen ions for the copper ions in the solution. As noted, because the organic solvent is immiscible with the aqueous solution, it can largely be separated therefrom by settling. However, some fraction of the organic solvent is inevitably entrained with the aqueous solution, and is lost unless it is separated therefrom. Similarly, some fraction of the organic solvent inevitably remains entrained with the electrolyte after they are substantially separated by settling. Such organic solvents are extremely expensive and are used in extremely large quantities in industrial-scale applications of this technique, such that it is highly desirable that efficient separation be provided.

The prior art suggests several techniques which might be employed for processing aqueous solutions to remove entrained organic solvents. For example, additional settling steps can be performed, or the aqueous solution can be filtered. However, filtration requires large vessels and extremely large quantities of filtration media, due to the enormous quantities of aqueous solution which must be processed. Settling is effective, but requires extremely large tanks, again due to the large volumes of the aqueous solutions which must be processed in any industrial-scale application of this technique. Indeed, most settling tanks are so vast that they must necessarily be exposed to sunlight, the ultraviolet radiation in which causes many organic solvents to break down. Accordingly, neither known technique is cost effective for removing entrained organic solvents from an aqueous process stream.

It is the understanding of the present inventors that techniques have been tried in which air has simply been mixed with the aqueous solution in settling tanks in order to remove the entrained organics, but that these methods have been unsuccessful in large-scale applications.

SUMMARY OF THE INVENTION

Accordingly, it is an object of the invention to provide a method for removal of entrained organic solvents from aqueous process streams which is simple and cost effective in processing large volumes of aqueous solutions as found in large-scale industrial processing operations.

It is a further object of the invention to provide a method and apparatus for removal of organic solvents from aqueous process streams of varying pH levels which occur at differing points in varying process plants.

According to the present invention, an aqueous process stream having organic solvent entrained therein is introduced at the top of a vertically extending reaction chamber. Bubbles of air are caused to flow upwardly from a position near the bottom of the vessel towards the top. The aqueous solution is withdrawn from a position in the vessel generally beneath the air inlet, such that countercurrent flow of the air with respect to the aqueous solution occurs over a large volume extending vertically in the reaction cell. Air bubbles rising vertically, countercurrent to the flow of the aqueous solution, tend to bind the organic molecules such that they are raised to the top of the cell. Preferably, the process parameters are such that a froth of bubbles is formed on the top of the aqueous solution in the vessel. The froth may be controlled to spill over into a collection trough where the bubbles eventually burst, leaving the organic solvent behind.

BRIEF DESCRIPTION OF THE DRAWINGS

The invention will be better understood if reference is made to the accompanying drawings, in which.

DESCRIPTION OF THE PREFERRED EMBODIMENTS

As mentioned above, this invention relates to recovery of organic solvents entrained in aqueous process streams, and has applicability to a wide variety of industrial processes. Thus, while in the following the invention is described in connection with a copper electrowinning process, the invention is not limited thereto.

Figure 1:
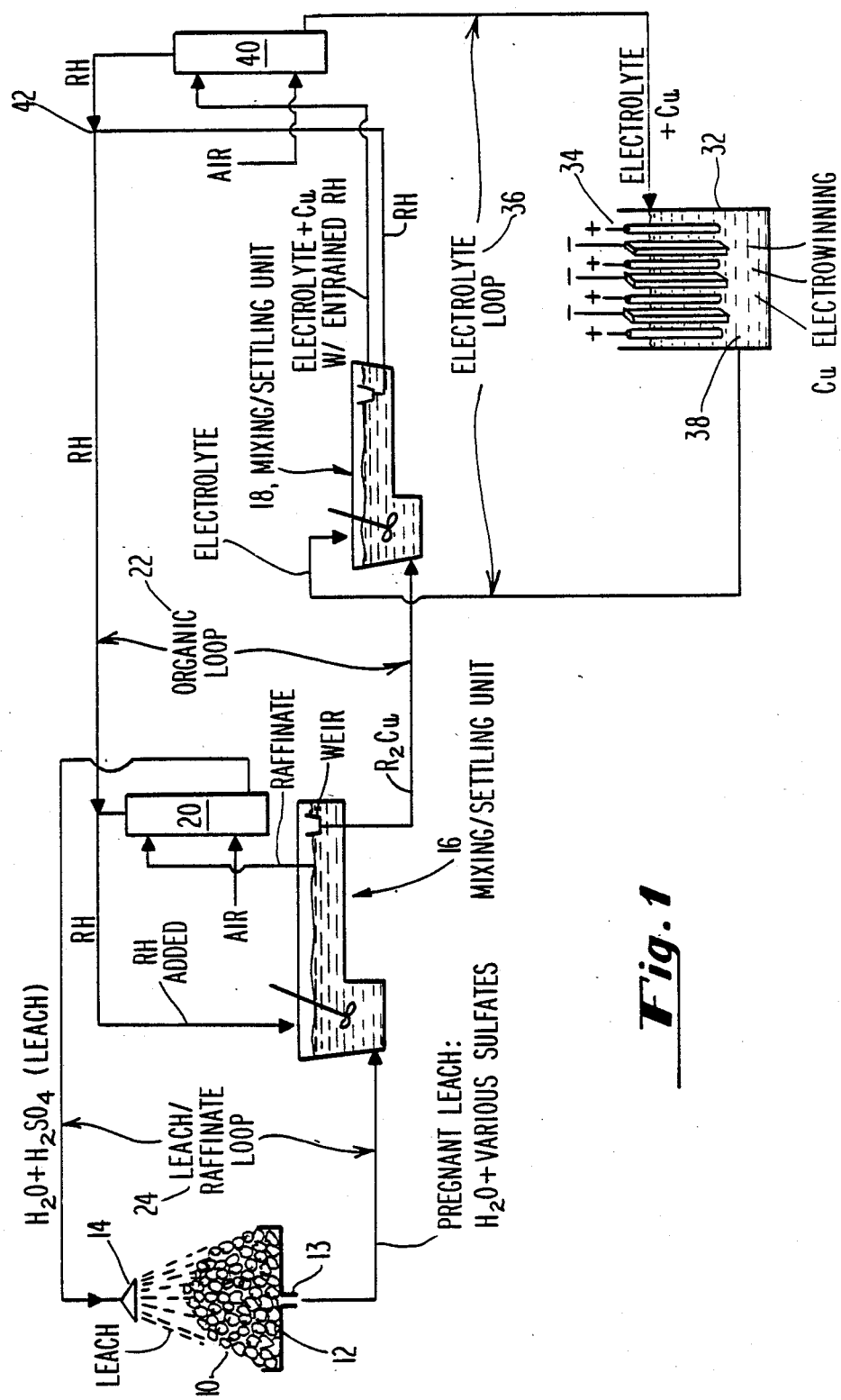
FIG. 1 shows a schematic view of a copper electrowinning process using solvent recovery techniques according to the present invention.

FIG. 1 shows a schematic view of a copper electrowinning process. At 10 a quantity of ore containing copper and other minerals typically in the form of oxides is disposed in a heap, or in a vat 12 having a drain 13. An aqueous leaching solution comprising a relatively weak solution of sulfuric acid in water, e.g. 5 to 20 grams of sulfuric acid per liter of water, referred to as the "leaching solution", is dumped over the ore 10 as indicated generally at 14. The leaching solution picks up copper as copper sulfate from the ore 10, as follows:

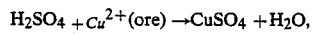

thus becoming what is referred to in the art as a "pregnant leach solution". This pregnant leach solution also typically includes other mineral sulfates, e.g. $MgSO_4$, $AlSO_4$, $FeSO_4$ and others. The pregnant leach solution is supplied to a mixing/settling unit 16 which may be a settling pond, and has added to it there an organic solvent the molecules of which contain an exchangeable hydrogen ion.

In FIG. 1, the organic solvent is referred to as "RH" when the solvent is in its hydrogenated form and as "$R_2Cu$" when the hydrogen ion has been exchanged for a copper ion, e.g., in the unit 16, as follows:

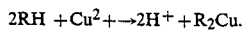

The organic solvent may typically be a mixture of kerosene and an extractant, e.g., LIX-622 produced by Henkel Corporation.

In the unit 16 the solvent molecules RH exchange the hydrogen ions for copper ions, taking the copper-rich $R_2Cu$ form. Because the organic solvent is immiscible in the pregnant leach solution, they can be separated simply by settling. The copper-rich solvent, $R_2Cu$, can then be removed from the unit 16 and placed in a second mixing/settling unit 18. Meanwhile, the leach solution, having had the copper-rich solvent removed, in which state it is commonly referred to as "raffinate", is also removed from unit 16 and reused as part of a leach/raffinate loop indicated at 24. All of these processes may be carried generally continuously.

Despite the immiscibility of the solvent in the raffinate, the latter will typically contain some entrained solvent; typically 20 to 60 ppm solvent will be contained within the raffinate solution. This is a relatively small amount on a percentage basis, but in a modern industrial-scale operation, wherein 250,000 gallons of organic solvent costing some 55 dollars per gallon may be employed, such a loss can be a significant economic factor. Furthermore, the presence of the organic solvent may interfere with further processing steps, such as the electrowinning step. According to the invention, therefore, the entrained organic solvent is removed from the raffinate in a first reaction cell 20 which will be detailed below in connection with FIGS. 2 and 3. The removed organic solvent RH is then returned to the "organic loop" indicated at 22 as shown.

The organic solvent chosen will typically be specific to the mineral of interest, so that it will not remove the Al, Mg and Fe sulfates for example, from the Cu leach solution; these ions can be removed elsewhere in the leach/raffinate loop 24 to prevent their undue buildup over time.

After the copper-rich organic solvent $R_2Cu$ is removed from mixing/settling unit 16 it is then placed in a second mixing/settling unit 18 as mentioned above. There it is mixed with an electrolyte solution which is also an aqueous acid solution, in this case containing 140 to 190 grams of sulfuric acid per liter. At this concentration the copper bound to the solvent molecules is preferentially exchanged with hydrogen ions from the acid, such that the aqueous solution then tends to contain $CuSO_4$ in solution as ions, and so that the organic solvent is rehydrogenated, that is, becomes RH once again. Again, the immiscibility of the organic solvent in the aqueous solution allows them to be separated essentially by settling; this may involve a multiple tank pouring operation with wiers, or other known techniques. The rehydrogenated organic solvent RH is then resupplied to the organic loop 22 as indicated generally at 30. The electrolyte containing $CuSO_4$ in solution is then supplied to an electrowinning operation indicated at 32. In this step, the copper-rich aqueous solution is placed in a vat and electric potential is supplied, e.g. across a number of stainless steel cathodes 34 and inert anodes. This causes copper at very high purity to be electroplated onto the cathode electrodes 34, concluding the electrowinning process. The electrolyte, having had the copper partially removed, is then returned to the "electrolyte loop" 36 as indicated at 38.

As indicated above in connection with the raffinate-leach loop, some of the organic solvent is entrained in and removed from unit 18 with the electrolyte having the copper therein. Accordingly, the electrolyte having the organic solvent $R_2Cu$ entrained therein is passed through a second cell 40, in which the organic solvent is removed effectively from the aqueous solution according to the method of the invention. This quantity of the organic solvent $R_2Cu$ is then returned to the organic loop 22, as indicated at 42, for reuse.

Figure 2:
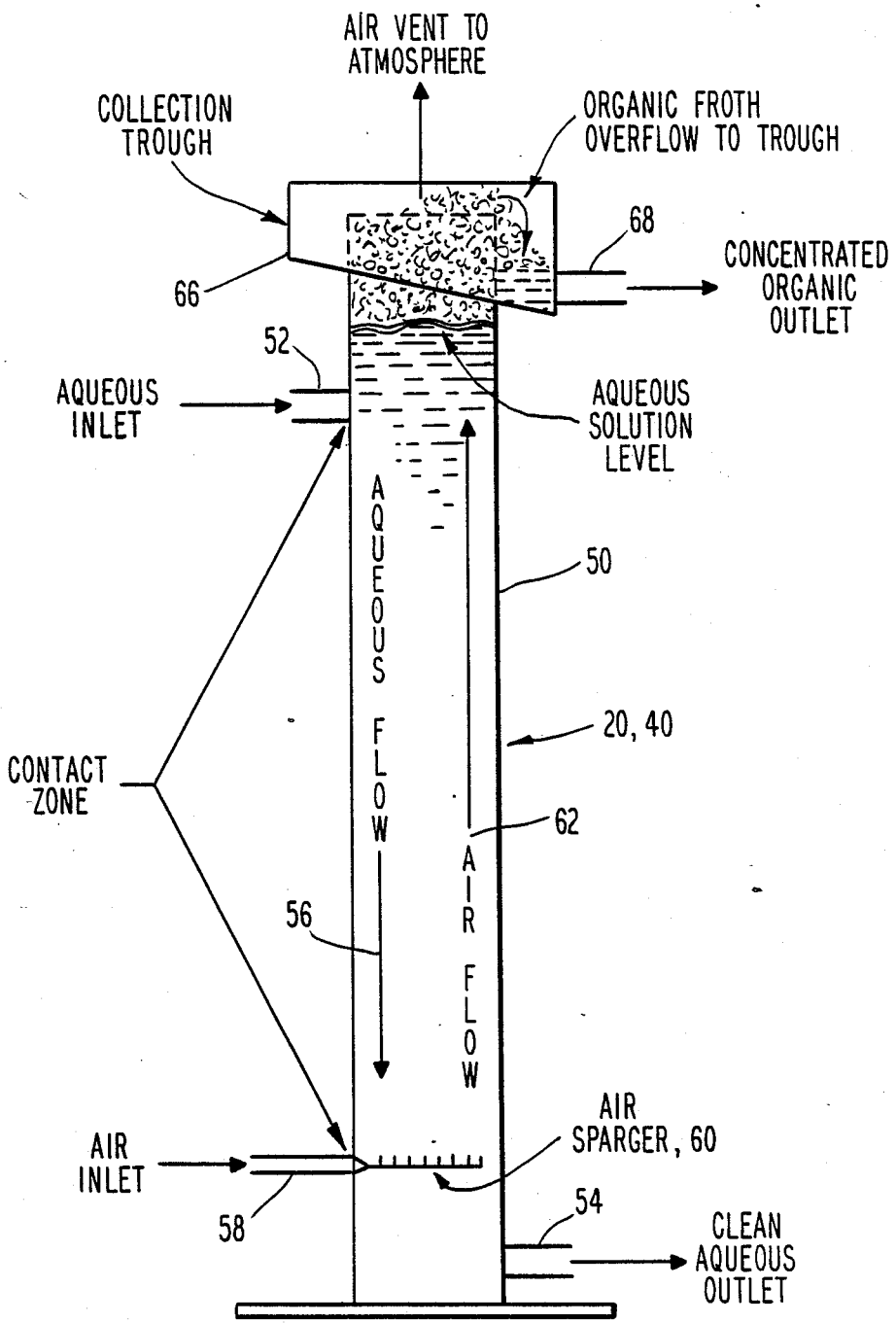
FIG. 2 shows a schematic diagram of an organic solvent recovery cell according to the invention.
Figure 3:
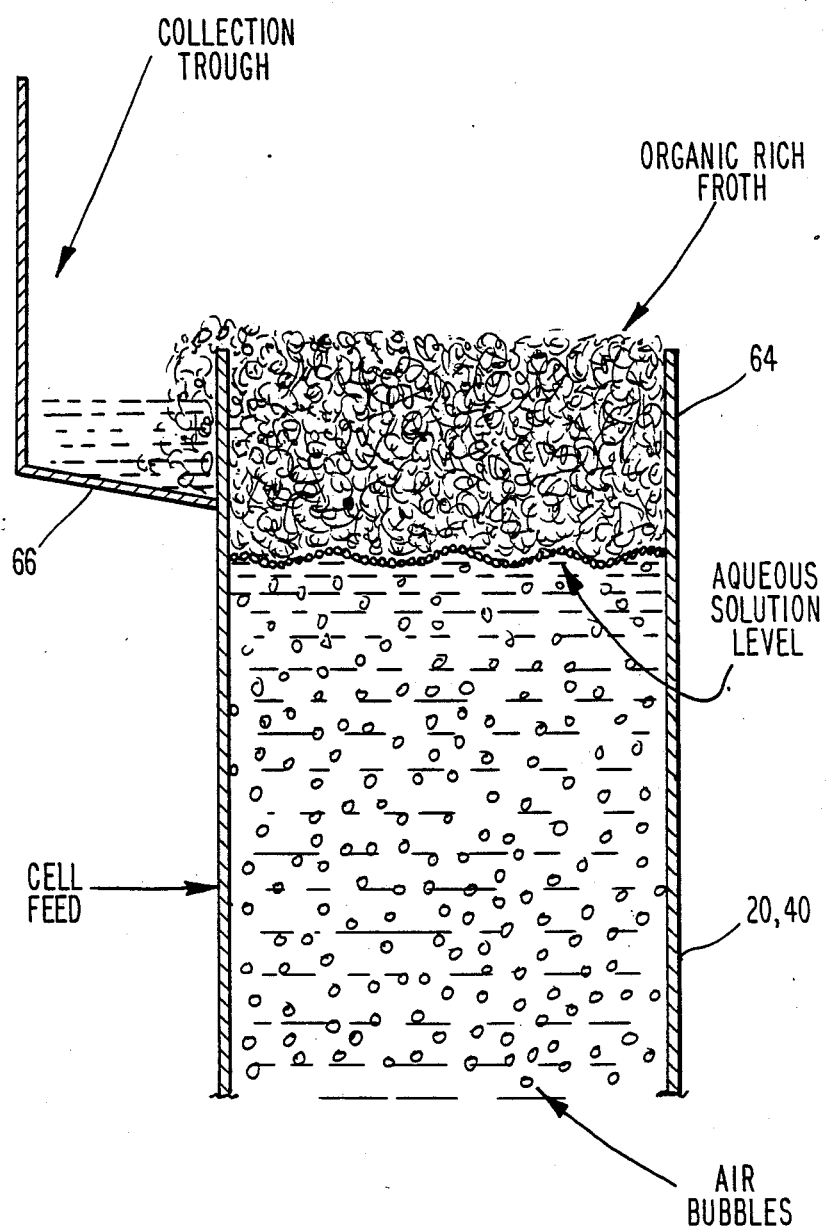
FIG. 3 shows a detail of the upper portion of the cell of FIG. 2 in use.
Figure 4:
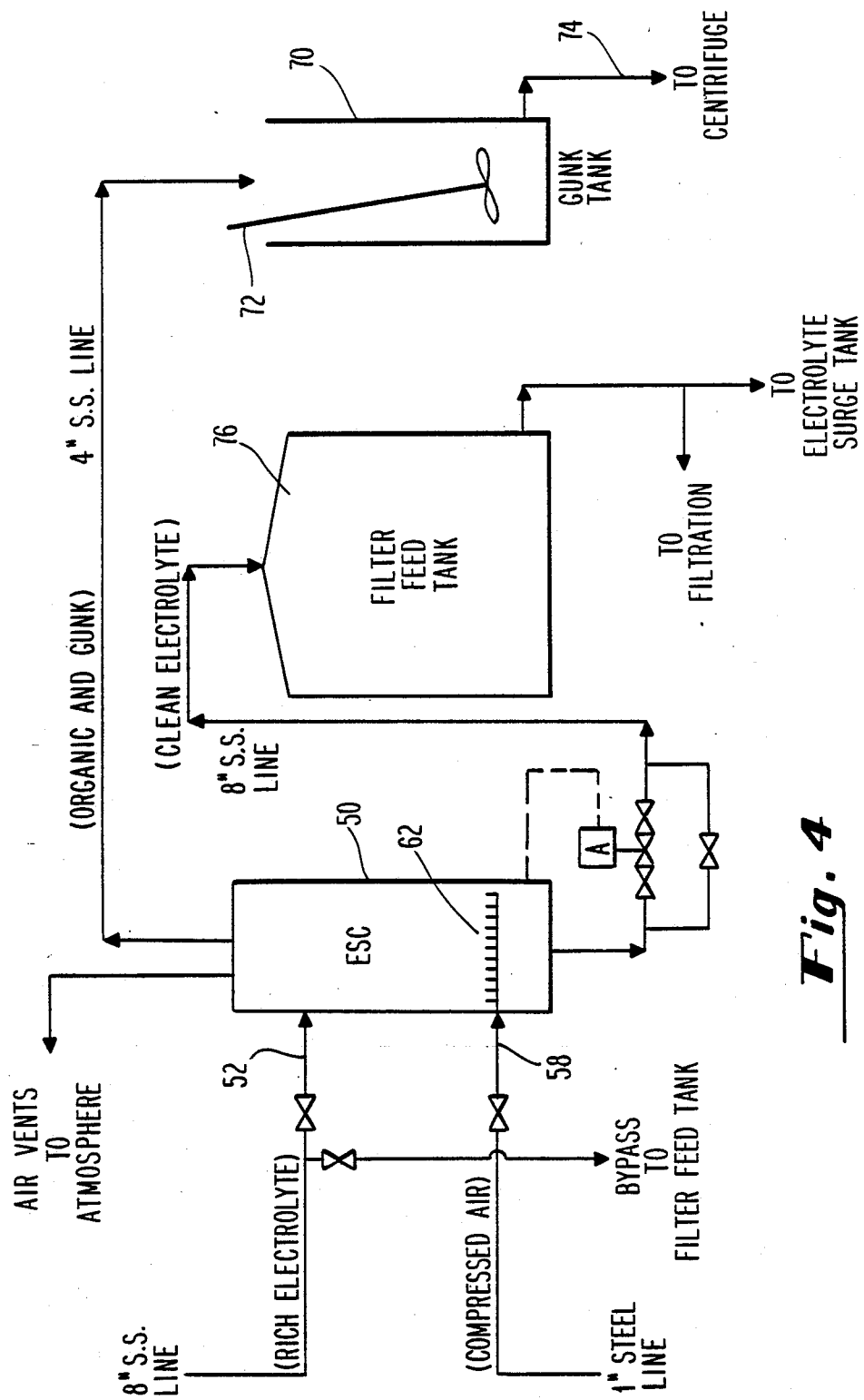
FIG. 4 shows a more detailed view of the apparatus used for solvent extraction according to the invention in a successfully tested version of the invention.

Thus, as indicated on FIG. 1, in a copper electrowinning process there are at least two occasions on which the organic solvent can be profitably separated from an aqueous process solution according to the technique of the invention. According to the invention, the aqueous solution having organic solvent entrained therein is supplied to the cells 20, 40 at the top of vertically elongated vessels 50 (FIGS. 2–4). Air is supplied towards the bottom of the vessels 50, and the aqueous solution, having had the organic solvent removed therefrom, is withdrawn from the vessels 50 beneath the point of introduction of the air. The air is caused to bubble upwardly through the aqueous solution in the vessels, creating a countercurrent, and the bubbles attract and bond the organic solvent molecules to themselves as they rise. Preferably, the bubbles form froths at the top of the vessels, which spill over the upper edges of the vessels into collection troughs, from which the organic solvent can be removed.

FIG. 2 shows the overall structure of the cells 20, 40 of the invention, while FIG. 3 shows a detail of the upper end of one of the vessels 50 in use.

As indicated in FIG. 2, the aqueous solution is processed in each of cells 20, 40 by being admitted via inlet 52 into a vertically extending vessel 50. The aqueous solution is removed from an outlet 54, such that the net flow of the aqueous solution is downwardly as indicated generally at 56. Compressed air is admitted at an air inlet 58 disposed somewhat above the outlet 54. The compressed air inlet 58 communicates with an air sparger 60, which is simply a tube having a number of holes formed therein, such that the air bubbles upwardly. Air bubbles rise as indicated at 62 and the immiscible droplets of organic solvent are attracted to and rise with the bubbles. The bubbles are controlled to form an organic-rich froth 64 as shown in FIG. 3. Over time the froth overflows the top of the vessel and is collected in a collection trough 66 from which the organic solvent, having been condensed, may be removed as indicated at 68.

An embodiment of the invention which was successfully tested may be described as follows. The aqueous solution was an electrolyte containing 45 grams per liter of copper as a sulfate and 170 grams per liter of sulfuric acid in solution with water containing approximately 60 parts per million organic solvent. The organic solvent was a mixture of kerosene and an extractant referred to as "LIX-622" produced by Henkel Corporation. The physical data for the vessel 50 were:

- overall height—20 feet;
- contact zone height—12 feet;
- diameter of vessel—1.5 feet;
- volume of contact zone—21.2 feet$^3$;
- specific gravity of electrolyte—1.3;
- flow rate of electrolyte feed—60 gpm;
- residence time in contact zone—2.6 minutes;
- air bubble diameter (average)—1 mm;
- depth of froth—3 inches;
- distance between solution level and electrolyte inlet—57 inches;
- distance between air inlet and electrolyte outlet—24 inches; and
- air addition rate (approximately)—3-4 cfm at 30 psi.

In a particularly suitable embodiment the air sparger 60 was made from a section of conventional perforated hose sold for garden watering. The material of this hose is a natural rubber which is essentially unaffected by the organic solvent or by the sulfuric acid in the aqueous solution. Bubbles of satisfactory size were produced by this sparging tube.

Operating as indicated above it was found that on average 80% of the organics entrained in the aqueous solution were recovered at the outlet 68. The recovered organics also contained a significant amount of organic-wetted particulate matter, which was subsequently processed by centrifuge to remove the particulates from the organic solution. Removal of particulates in this way is particularly advantageous, as these interfere with the electrowinning process, as the organics do also.

FIG. 4 shows in greater detail exemplary connections to the reaction vessel 50 shown in FIGS. 2 and 3. The example is of a test system used to evaluate the method of extracting organic solvent from aqueous process streams according to the invention. In this FIG. the acronym "ESC" refers to an electrolyte scrubbing column, that is, to the reaction vessel 50. As can be seen the electrolyte described above is supplied through an eight-inch stainless steel pipe to the aqueous inlet 52 of the vessel 50, while a one-inch steel pipe was used to supply compressed air to the air inlet 58. The air sparger 60 was as described above a section of perforated garden hose. The organic solvent and "gunk", that is, the organic wetted particulates and an electrolyte/organic/particulate air stable emulsion, were supplied over a 4 inch stainless steel line to a gunk tank 70 provided with a stirrer 72 and thence to a centrifuge for particulate separation as indicated at 74. The electrolyte was then supplied to a tank 76, which was also used to store electrolyte not processed according to the invention in this experimental apparatus. All of the electrolyte was subsequently filtered to remove the solvent. Filtration is not normally needed if the organic solvent is removed from the electrolyte according to the invention.

The formation of the froth is, as will be recognized by those of skill in the art, a function of the individual process parameters chosen and is directly related to the particular process stream and organic solvent to be separated according to the invention. In general, the bubbles rising to the surface of the solution in the vessel consist of air surrounded by a membrane of aqueous solution and organic solvent. As the bubbles rise through the froth, the aqueous solution flows off the bubble surface downwardly, back into the aqueous solution, under the influence of gravity. Because the organic solvent is hydrophobic, it remains on the surface of the bubble longer, so that the greater the froth depth the higher the proportion of organic solvent to aqueous solution in the froth.

Organic solvent is removed from the aqueous solution and collected by the bubbles by direct contact as the bubbles rise through the descending column of aqueous solution. To insure contact between the bubbles and the organic solvent, the available contact area must be maximized by control of the number and size of the air bubbles.

For a given aqueous solution the maximum number of bubbles introduced into the vessel should be constrained to remain below a point at which the air bubbles tend to join together and coalesce. The actual amount of air to be admitted can be readily determined experimentally.

The sizes of the bubbles should be minimized to provide the greatest amount of surface area per volume of air admitted. However, if the bubble diameter is reduced too far, the bubbles cannot overcome the downward velocity of the aqueous solution. The bubbles would then become entrained with the aqueous solution as do the organic droplets. The minimum bubble diameter is also a function of the density and viscosity of the aqueous solution and of the velocity of the aqueous solution through the vessel.

The preferred retention time of the aqueous solution in the vessel, that is, the optimum average residence time of the aqueous solution flowing through the vessel, can be determined experimentally for each particular process application and is related to the specific properties of a given aqueous stream. Applicants find that a typical retention time providing satisfactory results is much less than required for natural coalescence of the organics, e.g., in a settling operation; this makes the method of recovering the organic solvent according to the invention much more cost effective than settling. The reduced required retention time is a direct result of the increased probability of exposure of the organic solvent droplets to the air bubbles due to the countercurrent flow provided according to the invention. As described, the countercurrent flow is due to the introduction of the bubbles into the bottom of vessel in which the aqueous solution flows downwardly from an inlet to an outlet.

Those of skill in the art will readily be able to determine the optimum vessel diameter and depth and other parameters needed to provide bubbles of appropriate quantity and size in any particular organic solvent separation process to be addressed using the methods of the invention. In particular, it will be noted that the physical dimensions of the vessel are significant as follows:

1. The volume of the contacting zone between the air inlet and the aqueous solution inlet should be sufficient to allow the desired residence time as a function of the inlet and outlet feed rate.

2. The height to diameter ratio of the vessel should be maximized (within practical constraints) to provide the largest probability of collision between the rising air bubble and the entrained organic solution droplets. The effect is to provide increased residence time of any particular bubble within the aqueous solution.

3. The diameter of the vessel should be sufficient to prevent excessive coalescence of rising air bubbles, which has the effect of reducing their effective surface area.

Again, as noted, those of skill in the art will be able to design suitable apparatus giving attention to the above considerations.

While as indicated above a preferred embodiment of the invention has been shown and described in detail, this is not meant to be a limitation on the process of the invention, which has utility far beyond the copper electrowinning process described above, but only as exemplary thereof. The invention is limited only by the following claims.

We claim:

1. A method of removal of entrained droplets of an organic solvent immiscible in water from an aqueous process stream comprising the steps of:
   introducing the process stream containing the entrained organic solvent droplets, said solvent being present in said stream in a concentration of no more than about 500 ppm, at an upper location in a vertically extending vessel,
   introducing air in a manner such that bubbles are formed at a lower location in the vessel,
   permitting said bubbles to rise upwardly through said aqueous process stream, whereupon said droplets of organic solvent are effectively bound to said bubbles and a froth thereof accumulates on the upper surface of said aqueous solution in said vessel,
   withdrawing the aqueous process stream having had the organics removed therefrom from an outlet in the vessel beneath the point of introduction of the air thereto, and
   removing the froth from the top of the vessel.

2. The method of claim 1, wherein said organic solvent is of a material to which metal ions may be preferentially bonded.

3. The method of claim 1 wherein said steps are performed essentially continually.

4. The method of claim 1 wherein said froth is removed from said vessel by overflow therefrom into a collection trough at least partially surrounding said vessel.

5. The method of claim 1 wherein air is introduced into said vessel by way of a sparging tube, comprising closed-ended tube having a large number of small holes formed therein, under pressure, so that said bubbles are formed.

6. The method of claim 1 wherein the rates of introduction and withdrawal of said aqueous solution are controlled such that the point of introduction of said solution into said vessel is beneath the surface of said solution in said vessel.

7. The method of claim 1 wherein said process stream is a raffinate solution from a copper solvent extraction process.

8. The method of claim 1 wherein said aqueous process stream is an electrolyte solution from a copper solvent extraction/electrowinning process.

9. The method of removing entrained droplets of an organic solvent immiscible in water from an aqueous process stream, comprising the steps of:
   introducing the process stream containing the entrained organic solvent, the concentration of said solvent in said stream being no more than about 500 ppm, at a position near the top of a vertically elongated vessel;
   introducing bubbles of air at a position in said vessel near its bottom;
   causing said air to form bubbles in said aqueous solution;
   removing the aqueous solution from an outlet near the bottom of said vessel, beneath the point of introduction of said air;
   controlling the rate of flow of said aqueous solution into and out of said vessel and the supply of air to said vessel such that bubbles of air rising in said aqueous process stream bind droplets of said organic solvent thereto and cause said organic solvent to rise to the top of the level of the aqueous solution in the vessel; and
   removing said organic solvent from the top of said vessel.

10. The method of claim 9 wherein said steps are performed substantially continuously.

11. The method of claim 9 wherein said steps of controlling the rate of flow of the solvent through the vessel and supply of air thereto are controlled such that said bubbles tend to form a froth on the surface of the aqueous solution in the vessel.

12. The method of claim 9 wherein said aqueous solution is a raffinate solution from a copper solvent extraction process.

13. The method of claim 9 wherein said aqueous solution is an electrolyte solution from a copper solvent extraction/electrowinning process.

14. Method for recovering copper from ore, comprising the steps of:
   exposing a quantity of copper bearing ore to a leach solution comprising a relatively weak solution of sulfuric acid in water, to generate a pregnant leach solution bearing copper;
   mixing said pregnant leach solution with an organic solvent which is immiscible in water, such that said organic solvent bonds to copper ions in said pregnant leach solution;
   allowing the mixture of the organic solvent with the pregnant leach solution to settle, whereby the bulk of said organic solvent with the copper ions bound thereto can be removed from the pregnant leach solution, leaving a raffinate solution behind having a relatively small quantity of said solvent entrained therein, mixing said bulk of said organic solvent, having said copper ions bound thereto, with an electrolyte solution comprising a relatively strong solution of sulfuric acid in water, whereby the copper ions are removed from the organic solvent by the electrolyte solution;

allowing the mixture of said electrolyte solution with the copper ions bound thereto and said organic solvent to settle, and removing the bulk of said organic solvent from the electrolyte solution, leaving behind a small amount of said organic solvent entrained in said electrolyte solution;

removing said copper ions from said electrolyte solution by electroplating said copper from said electrolyte solution onto the cathode of an electrowinning cell; and removing droplets of entrained organic solvent from said raffinate and electrolyte solutions, by:

passing said solutions each into a separate reaction vessel near the top thereof;

admitting air in the form of bubbles near the bottoms of said vessels;

removing said solutions from said vessels at points beneath the points at which said bubbles are admitted, whereby countercurrent flow of said bubbles and said solutions occurs in each of said vessels; and removing droplets of said organic solvent, having been bound to said bubbles, from the upper portions of said reaction vessels.

15. The method of claim 14 comprising the further step of separating said organic solvent from said raffinate allowing said immiscible organic solvent to settle out of said raffinate.

16. The method of claim 14 wherein said step of separating said electrolyte solution from said organic solvent is performed by settling.

* * * * *

UNITED STATES PATENT AND TRADEMARK OFFICE
CERTIFICATE OF CORRECTION

PATENT NO. : 4,874,534

DATED : October 17, 1989

INVENTOR(S) : Sorensen, et al

It is certified that error appears in the above-identified patent and that said Letters Patent is hereby corrected as shown below:

On the title page, item [56] references cited, add the following U.S. Patent Documents:

| | | |
|---|---|---|
| 1,434,232 | 10/31/1922 | Sherwood............ |
| 2,145,269 | 01/31/1939 | Munro, et al........ |
| 2,938,629 | 05/31/1960 | Hollingsworth, et al........ |
| 3,246,749 | 04/19/1966 | Moser................ |
| 3,298,519 | 01/17/1967 | Hollingsworth....... |
| 3,434,596 | 03/25/1969 | Knaus................ |
| 3,446,353 | 05/27/1969 | Davis................ |
| 4,226,706 | 10/07/1980 | Degner, et al........ |
| 4,397,741 | 08/09/1983 | Miller............... |
| 4,592,834 | 06/03/1986 | Yang................. |

Signed and Sealed this

Twenty-ninth Day of January, 1991

*Attest:*

HARRY F. MANBECK, JR.

*Attesting Officer*  *Commissioner of Patents and Trademarks*